3,047,395
PROTEIN FOOD PRODUCT AND PROCESS

Irving I. Rusoff, Park Ridge, N.J., and William J. Ohan and Calvin L. Long, New City, N.Y., assignors to General Foods Corporation, White Plains, N.Y., a corporation of Delaware
No Drawing. Filed June 15, 1960, Ser. No. 40,989
18 Claims. (Cl. 99—14)

This invention relates to the production of meat-like food products from vegetable and animal protein sources. More particularly, the invention relates to the production of a meat-like, edible mass of protein having a texture and appearance simulating that of muscle protein found in common meat products like steaks, fowl, chops, hams and the like.

Heretofore, food technologists have borrowed liberally from the art of making so-called man-made fibers for the textile industry to produce a food product having a fibrous texture. Such work has been carried out in an effort to simulate the fibrous eating quality of meat. Such practices have followed the procedure of spinning a protein dope solution into filaments whereafter the protein filaments are precipitated in an acid bath. The protein fibers are thereupon collected and assembled into tows or otherwise aggregated and eventually compounded to produce meat-like products. Unfortunately, such fibers have the limitation that they are not capable of being cooked without disintegration. Binders must be employed in order to aggregate the fibers and such binders do not provide a sufficiently permanent cementing or aggregation of the fibers.

It would be desirable to provide a meat-like food product from such high protein sources as various vegetable protein meals as well as from low-cost cuts of meat. In addition, it would be desirable to provide a process whereby a more meat-like texture and appearance is offered than that which is provided by following the practices of the man-made edible protein fiber art as taught heretofore.

It is an object of the present invention to provide a meat-like texture and appearance from inexpensive sources of raw materials. A further object of the invention is to provide a meat-like texture and appearance in a product which has the ability to be cooked by deep fat frying, roasting, boiling or by any other means where elevated temperatures may be used without causing disintegration and loss of the structure and texture created. Still another object of the invention is to provide a product having the aforegoing characteristics which can be dehydrated without loss of texture or appearance upon rehydration and cooking.

It has now been discovered that the foregoing objects of the present invention can be accomplished by the rapid orientation and coagulation of protein material in a substantially undenatured, finely-divided, hydrated state under conditions which produce a shred-like structure. In carrying out the present invention, orientation and coagulation of the protein must be related one to the other so that coagulation follows orientation of the molecules whereby upon the action of the coagulation influence the molecules are set in a shred-like condition.

The protein must be present in a sufficient concentration to permit the protein molecules to be juxtaposed proximate one another prior to coagulation. The degree of concentration of the hydrated protein is dependent upon and will be varied in accordance with the source of protein being treated. For raw materials such as beef liver, the concentration can be reduced in comparison with proteins like soy which call for a higher concentration in order to arrange more protein molecules in suspension in close proximity with one another such that upon coagulation the molecules will become aggregated.

An animal protein source such as cheap cuts of meat, poultry or fish; meat scraps, poultry scraps or fish scraps; or a vegetable protein source such as soy bean meal, peanut, cottonseed or other vegetable protein meal high in protein recovered as by-products from the expression or solvent extraction of desired oils from source materials like soy beans, peanuts, cottonseeds, and the like, is comminuted to form a homogeneous mass which is used to form a paste or slurry by the addition of an aqueous liquid. Preparation of the paste or slurry is carried out under conditions wherein further denaturation of the protein is substantially avoided. Thus, room temperature water may be blended with the comminuted mass to obtain the desired consistency. It is a feature of the present invention also that other additives or modifying agents may be incorporated into the homogeneous mass prior to processing and included in this list of compounds are fats and oils, flavoring materials, protein hydrolyzates offering flavoring enhancement, meat extracts, colors and the like. Such additives or modifiers, of course, are in addition to the non-proteinaceous constituents of the protein source, which constituents, in the case of vegetable protein sources normally comprise a substantial proportion of carbohydrates. In this connection, it is also to be noted that a so-called fat-free vegetable protein meal or a protein meal which is not reduced to the level customarily encountered in recovering a vegetable protein meal from an oil expelling operation may be employed. Also, the liquid employed to form the slurry may be any aqueous liquid, preferably water but including such materials as milk, blood, salt solution and any other aqueous solution.

The foregoing hydrated paste or slurry is introduced into a reaction vessel, typically an autoclave designed in such a manner that steam may be injected into the homogeneous mass at the appropriate time. In the design of any reaction vessel for carrying out the present process, means must be provided for effectively agitating the protein mass in order to effect orientation and also to heat the mass rapidly in order to properly coagulate the protein when the discrete molecules are in proper juxtaposition with respect to one another. In this connection, the rapid orientation and coagulation are distinct features of the present invention for unless the material is adequately agitated, sufficient orientation of the proteinaceous material into a condition allowing it to be coagulated into a shred-like structure will not occur; instead a mass of coagulated protein not having any shred-like structure will be formed. Similarly, in the case of rapid heating to effect coagulation, the effect of rapid heating is to coagulate the entire mass in a substantially short length of time, say instantaneously; if heating is carried out in such a manner that it takes place slowly, the mass is differentially heated so that a shred-like coagulation does not take place. On the other hand, the rates at which agitation and heating are carried out are within the limits whereby the size of the shred-like formations may be controlled. In some products where an extremely elongated shred-like texture would be desired as in the case of chicken breast, hams and any area where the texture of muscle protein is being simulated, an extremely rapid agitation and rapid heat coagulation is practiced. In cases where short shreds are desired, correspondingly less rapid agitation and heating is carried out.

In carrying out the process of the present invention in the reaction vessel specified hereinabove, the steam introduced at the lower extremity of the reaction vessel under a high pressure heats the slurry or paste-like mass thereby reducing its viscosity and facilitating orientation through the combined agitating effect of the agitator and the steam. In this connection, it is possible to poise the steam introduced to the reaction vessel in such a manner as to replace all or part of the agitation produced by the rapidly spinning blades. In carrying out agitation to effect proper orientation of the molecules as stated hereinabove it is important to practice the proper concentration of protein material with respect to the liquid medium as well as the other additives or modifiers employed in compounding the slurry or paste. At too low a concentration an insufficient number of denaturable or precipitable protein molecules will be present so that they will not juxtapose themselves relative to one another in a linear form whereby they will produce a shred-like mass upon coagulation.

As the temperature is elevated, the protein material will be denatured and will "set-up" into the coagulated shread-like form desired. In achieving this denaturation, it is important as indicated above that the denaturation temperature which is a function of the raw material being processed be arrived at rapidly in less than about five minutes and preferably instantaneously in order that the entire mass can be coagulated at substantially the same time. Otherwise, the oriented protein molecules will denature differentially and disallow the formation of shreds. Various heating methods may be used provided they permit the desired rapid rate of uniform heating which will prevent selective denaturation. Agitation is employed to provide uniformity of temperature throughout the batch and to provide the required orientation. In lieu of the foregoing batch-type of operation a continuous system may be employed which comprises means of adequately orienting a continuous flowing stream of the protein paste and means for applying heat to hydrate and coagulate the oriented mass. Thus, a continuous reactor, wherein agitation is provided by suitable mechanical means, or by introducing steam or both, and wherein heat is applied by jacketing with suitable materials such as dowtherm or high pressure steam, or by introduction of steam to the mass, or both, will provide conditions suitable for shred formation.

In carrying out the present invention, a protein source such as beef muscle, trimmings or scraps; beef liver, trimmings or scraps; other edible portions of beef; lamb or pork muscle, trimmings or scraps; poultry muscle, trimmings or scraps; fish muscle, trimmings or scraps; fish flour; or vegetable protein flour and the like, is treated as by comminution to effect a homogeneous mixture. It is preferred that the protein content of the protein source be 30–100% of the solids on a dry basis and in the case of vegetable protein, as high as possible for reasons of control. One means of preparing the homogeneous mixture, particularly in the case of meat or meat by-products is by grinding through a meat grinder having $\frac{1}{8}$–$\frac{1}{4}$" holes.

The protein source is admixed with sufficient moisture in the form of water or other aqueous liquid to prepare a slurry or paste having a 50–80% moisture content.

The paste or slurry is placed in a reaction vessel, typically an autoclave or continuous reactor such as the Votator and heated rapidly to a temperature of 300°–400° F. and preferably 330°–360° F. Where the slurry or paste is heated to less than 300° F., little or no fiber formation takes place whereas at temperatures above 400° F. the fibers or masses of shreds start to decompose with a resultant loss of cohesiveness, chewiness and texture. The heating of the paste from room temperature to maximum temperature should be rapid and generally a heating period of less than 5 minutes is preferred, 1 to 2 minutes being most preferred. If the rate of heating is so slow that a temperature of about 400° F. is not reached in about 5 minutes, the resultant product is soft, lacks the desired cohesiveness and shred character, and contains excessively degraded protein.

During heating, agitation should be maintained constantly to provide uniform heat transfer and prevent charring of the product and also to aid in the orientation and stretching of the molecules so that they are placed in proper juxtaposition with respect to one another prior to coagulation. Preferably the agitating device employed should rotate in the order of 30–500 r.p.m. in order to obtain the desired shreds and chunks of shreds. At agitation rates over about 500 r.p.m., shreds and chunks of shreds tend to break down into smaller units which are not as desirable.

As soon as the paste or slurry has been heated to the desired temperature, cooling is commenced and is carried out as rapidly as possible until a temperature of at least 200° F. and preferably 100° F. to 150° F. is reached.

The resulting cooled product will generally be obtained in a yield of about 30–85% of the total starting solids in the form of shreds or masses of shreds, the remainder of the starting material existing as a soupy mass which may contain small fragmentary shred particles, the yield being dependent upon the starting material employed and the processing conditions utilized. The soupy mass may be recycled in subsequent batches depending upon the raw material source to provide further shred formation. Such formation will to a large extent depend on the degree of protein degradation, the protein concentration, the source of original starting material, etc.

The cooled shreds are separated from the supernatant liquid, usually in the form of a soupy mass by any common means such as screening, decanting, etc. The shreds generally have a solids content 5–10% higher than the solids content of the starting material. The shreds may be washed, sliced, flavored and color added or they may be first bleached and then subsequently flavored and colored.

The shreds may be used in food preparations which would employ meats such as beef, chicken, fish, and may be used in a variety of products calling for the use of such protein shreds or for nutritious non-meat components.

The invention will now be more fully described by the following examples:

*Example 1*

A meat replacement was prepared employing soy flour derived by the hexane extraction of soy bean oil from soy beans, the soy flour being substantially undenatured and having a moisture content in the order of 10% by weight. About 8 pounds of this soy flour was mixed with 10 pounds of water and slurried in a Day Mixer to produce a thick paste. The paste was then introduced to an autoclave having a 5-gallon capacity.

The autoclave used was equipped with a jacket piped for steam heating and water cooling, a thermowell extending into the center of the autoclave cavity to contain a thermocouple (which when attached to a potentiometer was used to determine internal temperature of the autoclave), a valved vent opening for the relief of gases from the head of the autoclave, a pressure indicating gauge, a separate opening piped to a rupture disc as a safety relief, and a flush valve in the base of the autoclave normally acting as a discharge port but adapted to serve as a steam injection port during the process. The interior of the autoclave was also fitted with cooling coils and an anchor type agitator. The agitator blades were approximately 9¼ inches across and the width of the vessel 10 inches, thus providing close clearance for prevention of material adhering and building up on the side walls. Variable agitator speeds were provided via the use of various sheaves. The coils piped for water cooling, described a cylinder above the agitator blades and proximate to the side walls.

Following introduction of the soy flour paste charge, the autoclave was closed and steam was introduced through the steam-injection port to heat the paste. Initially a period of 5–10 seconds of injection of 400 p.s.i.g. steam was required in order to reduce the viscosity of the paste sufficiently to start agitation. Thereafter, steam was continuously introduced to the autoclave and the agitator was operated at 400 r.p.m. Agitation and heating under the above-specified conditions for approximately 1 minute and 15 seconds provided a charge temperature of 360° F. as read with the potentiometer whereafter steam-injection was terminated and cooling water was circulated through the cooling coils and through the jacket surrounding the reaction vessel to cool the charge down to approximately 100° F. as read with the potentiometer.

Upon opening the autoclave, it was found that through this operation the protein was coagulated to produce shred-like fibrous material. Shred formations were collected from the cooling coils as well as from the base of the vessel. Forty percent by weight of the solids fed to the reactor were recovered in the desirable shred form.

In a further extension of this example the thin non-shred containing slurry which remained after collection of the shreds was utilized with fresh soy paste in the preparation of more shred material. A similar percentage of solids were converted to the shred stage indicating the potential utility of this residual slurry and higher overall conversions.

The materials as collected had semblances of meat roasts or chicken parts. The composition, in addition to its shred-like gross appearance, had a plastic-pliable somewhat elastic nature which permitted physical compaction of the fiber, if desired, to give various elongated continuous structures, meat-like in texture. The material was dehydrated and thereafter rehydrated readily upon water cooking. It was also possible using the product of this example to freeze the meat-like structure and to re-thaw it without loss of texture in the manner of ordinary cuts of meat. Upon cooking either after recovery from the reaction vessel, freezing or dehydrating the material very substantially retains its original shape and texture. In the mouth, the composition could be generally characterized as non-sinewy, yet it held together cohesively, approaching the eating textural properties of meat.

The product can be conditioned or modified in terms of flavor and aroma as well as in terms of texture by smoking and/or by the incorporation of modifying agents. By boiling the shred-like composition in bouillon or soup stock, it was observed to absorb much of the flavors present; preferably this fortification of the product with flavor is carried out subsequent to dehydration under which condition the dehydrated product of this invention swells and absorbs greater quantities of flavoring ingredients. When fried in butter, a crisp, crunchy product simulating chitlins or the lean of bacon was noted.

Advantageously in comparison with ordinary dehydrated cuts of beef and other types of meat, the product will rehydrate to a less tough texture without an loss in rate of rehydratability. This property allows the product to be employed in either a dehydrated or hydrated condition in various retail food products.

*Example 2*

Twenty-two pounds of raw beef liver having a solids content of approximately 30% by weight was ground through a Hobart meat grinder with ⅛ inch openings and charged into the autoclave of Example 1. Agitation in this case was feasible and was started prior to steam-injection, the agitation being approximately at the same rate as above. As agitation was commenced steam at 400 p.s.i.g. was introduced to the reaction vessel and the operation was continued for about 3¼ minutes at which time a terminal temperature of 390° F. was obtained. Steam-injection was stopped after 3¼ minutes of processing and agitation was continued as cooling water was added to the coils and the jacket of the vessel. After the temperature of the product reached approximately 100° F. agitation was stopped. Upon opening the autoclave approximately 25% of the material fed was collected in a fibrous shred-like form from the coils of the agitator, the remainder being located at the bottom of the vessel in a liquid slurry. On a dry basis, the shred collected had a total protein content of 25% (N×6.25). The slurry had a total protein content of 20% on the dry basis. The product had meat-like characteristics offering the flavor of liver but without its non-fibrous textural quality.

*Example 3*

Beef hearts were transformed into a shred-like material similar to that of Example 2 by the process of Example 2 except that autoclaving was carried out for 1½ minutes to a terminal temperature of 360° F. The product of this process was substantially the same as that of Example 2.

*Example 4*

Fish flour produced by the solvent extraction of menhaden was transformed into a meat-like product by employing substantially the process of Example 1. Nine pounds of fish flour, 5 pounds 10 ounces of shortening and 7 pounds of water were blended to produce a paste, 21 pounds of which were charged into the autoclave of Example 1. The process was carried out in substantially the manner of Example 1 with 1 minute 30 seconds of steam injection being employed to achieve a terminal temperature of 375° F. Agitation was continued during cooling until a temperature of 100° F. was obtained. The process yielded approximately 30% of the initial solids as shred-like material similar in properties and texture to that of Example 1.

*Example 5*

Meat shreds were prepared from a homogeneous slurry composed of equal parts chicken paste and water using a continuous reactor. The chicken paste was obtained from meat that was separated from the backs and necks of chicken and subsequently comminuted.

A Moyno type positive displacement pump was used to feed the slurry to a Model X1D Votator. The Votator had a cylinder 3 inches in diameter and 1 foot long with a shaft running the length of the cylinder which was equipped with 2 equidistantly spaced blades extending from the shaft to the cylinder wall. A short length of piping in which an industrial thermometer was installed to indicate product temperature connected the Votator to a water cooled double pipe heat exchanger 6 feet in length. The system extended from here to an expansion chamber 3 inches in diameter and 12 inches long which served as a holding section to collect the product.

The entire system was first filled with water to prevent surging and flashing as it was filled with shreds and chunks. The Votator was operated at 30 r.p.m. and 550° F. Dowtherm circulated through the jacket of this unit. The slurry was pumped continuously to the Votator where it was rapidly heated from ambient to 360° F. in 1 to 2 minutes. The material was cooled as it was forced through the heat exchanger and on into the collection chamber, displacing water as it moved. Continuous operation was maintained until the collection chamber was filled. Upon opening the holding section, meat chunks and shreds ½ to 6 inches in length and ½ inch in diameter (pipe diameter) were collected. About 35% of the solids by weight were collected in the form of shreds or chunks. The product was similar to cooked chicken meat in texture and general appearance and was considered to have a good meat texture and cohesiveness when tested in the mouth.

*Example 6*

Meat-like shreds were made using a soy protein isolate obtained by isoelectric point precipitation of protein solubilized from defatted soy meal.

Twenty pounds of soy protein isolate having a 32% solids content was placed into the autocalve described in Example 1. Steam was introduced through the steam-injection port at a pressure of 400 p.s.i.g. and continued for 90 seconds, ranging from 200 to 400 p.s.i.g. during this period. The agitator was operated at 450 r.p.m. while the material was heated to a peak temperature of 360° F. after which steam injection was terminated and cooling water circulated through the coils and jacket to lower the internal temperature to 220° F. When the autoclave was opened a solid shred-like mass was located on the coils, agitator and in the residual liquor. The product was fibrous in appearance, quite similar to beef chunks in texture and chewiness as well as in appearance. A 64% yield of initial solids was obtained as shreds on a weight basis.

The present composition can be described as generally comprising a sinuous aggregation of comminuted, coagulated, proteinaceous tissue which can be unidirectionally oriented or randomly oriented. The novel composition of the present invention can be in the form of elastic fibers or shred-like masses. Such fibers or shred-like masses resemble the fibers or fibrous masses of muscle tissue very closely and have many of the desired eating qualities of meat cuts obtained from muscle tissue portions of the animal. The product can be derived from vegetable or animal protein. The animal protein may be either beef, poultry, lamb, pork, fish, or the like, and the vegetable protein may be a protein obtained from oleaginous nuts and seeds such as soybeans, cottonseed, peanuts, and the like.

The process of the present invention is particularly suitable in adapting certain low cost by-products of the meat packing industry such as beef scraps and trimmings or chicken backs and necks to a more fibrous or shred-like texture of good eating quality. Similarly, the process of the present invention can be employed to transform the protein of hearts, livers, kidneys, and the like such that the composition with respect to animal protein can be derived from ordinary striated or cardiac muscle tissue. Of particular note is the fact that in the poultry processing industry, the utilization of chicken backs, necks and the like has always presented a problem. Heretofore, such chicken parts have been ground, deboned and sold for low cost animal feed. According to the present invention, it is now possible to process such materials into high quality products which can be sold for human consumption thereby resulting in a much higher profit for the processor. Of similar importance is the utilization of beef trimmings and scraps which are also used in animal feeds to prepare high quality products for human consumption. In addition, non-meat materials such as vegetable protein or flour and fish flour provide eminently satisfactory meat-like products when treated by the process of the present invention.

It will be understood that while the invention has been described in part by means of specific examples, reference should be had to the appended claims for a definition of the scope of the invention.

What is claimed is:

1. A process for preparing a meat-like protein product having a shred-like texture which comprises rapidly heating a protein material in a substantially undenatured, finely divided, hydrated state to a temperature of 300°–400° F., continuously agitating said protein material during heating to orient and coagulate it, and cooling said orientated and coagulated protein material as rapidly as possible.

2. A process for preparing a meat-like protein product having a shred-like texture which comprises rapidly heating a protein material in a substantially undenatured, finely divided, hydrated state to a temperature of 300°–400° F., continuously agitating said protein material during heating to orient and coagulate it, and cooling said oriented and coagulated protein material as rapidly as possible to a temperature less than 200° F.

3. A process for preparing a meat-like protein product having a shred-like texture which comprises heating a protein material in a substantially undenatured, finely divided, hydrated state to a temperature of 330°–360° F. in less than 5 minutes, continuously agitating said protein material during heating to orient and coagulate it, and cooling said oriented and coagulated protein material as rapidly as possible to a temperature less than 200° F.

4. A process according to claim 3 wherein the protein material has a protein content of 30–100% of the solids on a dry basis.

5. A process for preparing a meat-like protein product having a shred-like texture which comprises finely dividing substantially undenatured protein material having a protein content of 30–100% of the solids on a dry basis, adding sufficient moisture to said protein material to form a slurry of said protein material and moisture wherein the moisture content is 50–80%, heating said slurry to a temperature of 300°–400° F. in less than 5 minutes to orient and coagulate the protein material, continuously agitating said protein material during heating to orient and coagulate it, and cooling said oriented and coagulated protein material as rapidly as possible to a temperature less than 200° F.

6. A process for preparing a meat-like protein product having a shred-like texture which comprises finely dividing substantially undenatured protein material having a protein content of 30–100% of the solids on a dry basis, adding sufficient moisture to said protein material to form a slurry of said protein material and moisture wherein the moisture content is 50–80%, heating said slurry to a temperature of 330°–360° F. in less than 5 minutes to orient and coagulate the protein material, continuously agitating said protein material during heating to orient and coagulate it, and cooling said oriented and coagulated protein material as rapidly as possible to a temperature less than 200° F.

7. The process of claim 6 wherein the heated material is rapidly cooled to a temperature of 150°–100° F.

8. A process for preparing a meat-like protein product having a shred-like texture which comprises finely dividing substantially undenatured protein material having a protein content of 30–100% of the solids on a dry basis, adding sufficient moisture to said protein material to form a slurry of said protein material and moisture wherein the moisture content is 50–80%, heating said slurry to a temperature of 300°–400° F. in 1–2 minutes to orient and coagulate the protein material, continuously agitating said protein material during heating to orient and coagulate it, and cooling said oriented and coagulated protein material as rapidly as possible to a temperature less than 200° F.

9. The process of claim 8 wherein the heated material is rapidly cooled to a temperature of 150°–100° F.

10. A process for preparing a meat-like protein product having a shred-like texture which comprises finely dividing substantially undenatured protein material having a protein content of 30–100% of the solids on a dry basis, adding sufficient moisture to said protein material to form a slurry of said protein material and moisture wherein the moisture content is 50–80%, heating said slurry to a temperature of 330°–360° F. in 1–2 minutes to orient and coagulate the protein material, continuously agitating said protein material during heating to orient and coagulate it, and cooling said oriented and coagulated protein material as rapidly as possible to a temperature less than 200° F.

11. The process of claim 10 wherein the heated material is rapidly cooled to a temperature of 150°–100° F.

12. A product having a fibrous mass resembling high quality meat cuts in texture and appearance which comprises a sinuous aggregation of comminuted, coagulated, oriented proteinaceous material.

13. The product of claim 12 wherein the proteinaceous material is animal protein.

14. The product of claim 12 wherein the proteinaceous material is beef.

15. The product of claim 12 wherein the proteinaceous material is poultry.

16. The product of claim 12 wherein the proteinaceous material is fish.

17. The product of claim 12 wherein the proteinaceous material is a vegetable protein.

18. The product of claim 12 wherein the proteinaceous material is soybean protein.

References Cited in the file of this patent

UNITED STATES PATENTS 2,830,902    Anson et al. _____ Apr. 15, 1958